( 12 ) United States Patent
Zhang et al.

(10) Patent No.: US 11,739,246 B2
(45) Date of Patent: Aug. 29, 2023

(54) METHODS OF RECYCLING OIL FROM A DIRECT PHASE EMULSION

(71) Applicant: M-I L.L.C., Houston, TX (US)

(72) Inventors: Hui Zhang, Houston, TX (US); Jeremy Smith, Houston, TX (US); Xia Wei, Houston, TX (US); Weiqing Huang, Houston, TX (US); Steven Philip Young, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 104 days.

(21) Appl. No.: 17/254,884

(22) PCT Filed: Jul. 1, 2019

(86) PCT No.: PCT/US2019/040065
§ 371 (c)(1),
(2) Date: Dec. 22, 2020

(87) PCT Pub. No.: WO2020/006546
PCT Pub. Date: Jan. 2, 2020

(65) Prior Publication Data
US 2021/0261848 A1 Aug. 26, 2021

Related U.S. Application Data

(60) Provisional application No. 62/692,039, filed on Jun. 29, 2018.

(51) Int. Cl.
*C09K 8/26* (2006.01)
*B01D 17/04* (2006.01)

(52) U.S. Cl.
CPC .............. *C09K 8/26* (2013.01); *B01D 17/047* (2013.01)

(58) Field of Classification Search
CPC .......... C08F 2/26; C08F 2438/03; C08F 2/10; C08F 293/005; C09K 8/5083; C09K 8/68; C09K 8/88; C09K 8/26; C09K 2208/30; C09K 8/035; B01D 17/047
See application file for complete search history.

(56) References Cited

U.S. PATENT DOCUMENTS

| 9,451,765 | B2 * | 9/2016 | Cuer | A61L 2/23 |
| 10,307,719 | B2 * | 6/2019 | Floyd, III | C08G 65/22 |
| 2007/0111896 | A1 | 5/2007 | Knox et al. | |
| 2014/0110115 | A1 * | 4/2014 | Reddy | C09K 8/514 |
| | | | | 166/305.1 |
| 2016/0115425 | A1 * | 4/2016 | Blankenburg | B01D 17/047 |
| | | | | 554/20 |
| 2016/0152882 | A1 * | 6/2016 | Eriksen | C02F 1/722 |
| | | | | 507/140 |

FOREIGN PATENT DOCUMENTS

RU 2288771 C1 * 12/2006

* cited by examiner

*Primary Examiner* — Kumar R Bhushan

(57) ABSTRACT

A method of recycling a direct emulsion wellbore fluid may include disrupting a direct emulsion comprising an aqueous external phase and an oleaginous internal phase, wherein the direct emulsion is stabilized by a surfactant composition; and separating the aqueous phase and the oleaginous phase.

12 Claims, No Drawings

METHODS OF RECYCLING OIL FROM A DIRECT PHASE EMULSION

CROSS REFERENCE PARAGRAPH

This application claims the benefit of U.S. Provisional Application No. 62/692,039, entitled "METHODS OF RECYCLING OIL FROM A DIRECT PHASE EMULSION," filed Jun. 29, 2018, the disclosure of which is hereby incorporated herein by reference

BACKGROUND

During wellbore operations, various fluids are typically used in the well for a variety of functions. The fluids may be circulated through the wellbore during drilling, completions, production, and the like, and may subsequently flow upward through the wellbore to the surface. During this circulation, wellbore fluids may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

As wellbore fluids are used and collected, used wellbore fluids may contain a number of solids and impurities that may be altered substantially from the original formulation. Used fluids are often contain large amounts of hydrocarbon and are classified as special waste, which needs to be transported in tanks or piping for reconditioning or for disposal according to local regulations. Disposal and treatment of used wellbore fluids can introduce significant additional costs and operational time in hydrocarbon recovery.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of recycling a direct emulsion wellbore fluid that includes disrupting a direct emulsion comprising an aqueous external phase and an oleaginous internal phase, wherein the direct emulsion is stabilized by a surfactant composition; and separating the aqueous phase and the oleaginous phase.

Other aspects and advantages of the claimed subject matter will be apparent from the following description and the appended claims.

DETAILED DESCRIPTION

In one aspect, embodiments of the present disclosure are directed to methods of recycling direct emulsions. In one or more embodiments, direct emulsion wellbore fluids are disrupted to separate the wellbore fluids into their constituent aqueous and oleaginous phases, which may then be processed and reformulated for further use or disposal. The particulars shown herein are by way of example and for purposes of illustrative discussion of the examples of the subject disclosure only and are presented in the cause of providing what is believed to be the most useful and readily understood description of the principles and conceptual aspects of the subject disclosure.

In one or more embodiments, methods may include demulsification of a direct emulsion fluid following use in a wellbore. A direct emulsion includes an aqueous external phase and an oleaginous internal phase that are stabilized by a surfactant composition. During demulsification, the surfactant composition is destabilized, during which the internal oleaginous phase coalesces and phase separates. Demulsification times may depend on a number of factors, including time, temperature, pH, ionic strength of the aqueous phase, chemical demulsifier concentrations, and the like.

In one or more embodiments, destabilized direct emulsions may be separated by a number of methods that may include one or more of settling, centrifuging, flocculating, dewatering, skimming, filtering, and other separation processes to separate solids, oil, and water. Separated aqueous and oleaginous phases may be processed further and reformulated for reuse in various wellbore-based and non-wellbore-based applications, or may be disposed of in accordance with regional requirements.

Direct Emulsion Wellbore Fluids

Wellbore fluids in accordance with the present disclosure include direct emulsion wellbore fluids having an aqueous phase and an oleaginous phase that are stabilized by a suitable surfactant composition. Direct emulsions in accordance with the present disclosure may be formulated as various wellbore fluids, including drilling fluids, completion fluids, workover fluids, packer fluids, and the fluids used in remedial treatments.

In one or more embodiments, the oleaginous internal phase of a direct emulsions may include oleaginous liquids such as natural or synthetic oils selected from a group that may include diesel oil, mineral oil, synthetic oils such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art.

Direct emulsions in accordance with the present disclosure may have an aqueous external phase containing an aqueous fluid such as fresh water, sea water, a brine containing organic and/or inorganic dissolved salts, liquids containing water-miscible organic compounds, and combinations thereof. For example, the aqueous fluid may be formulated with mixtures of desired salts in fresh water. Such salts may include alkali metal chlorides, hydroxides, or carboxylates, and halide or carboxylate salts of mono- or divalent cations of metals, such as cesium, potassium, calcium, zinc, and/or sodium. In some embodiments, aqueous fluids may contain salts such as sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides.

In one or more embodiments, direct emulsion wellbore fluids may have percent by volume (vol %) of oleaginous internal phase in a range having a lower limit selected from any of 10 vol %, 15 vol %, 20 vol %, and 30 vol %, to an upper limit selected from any of 40 vol %, 50 vol %, and 60 vol %, where any lower limit may be combined with any upper limit.

In one or more embodiments, direct emulsion wellbore fluids may have percent by volume (vol %) of aqueous external phase in a range having a lower limit selected from any of 50 vol %, 60 vol %, and 70 vol %, to an upper limit selected from any of 70 vol %, 80 vol %, 85 vol %, and 90 vol %, where any lower limit may be combined with any upper limit.

Direct Emulsion Surfactant Compositions

Direct emulsions in accordance with the present disclosure may be stabilized by a surfactant composition containing one or more direct emulsifiers. In one or more embodiments, the direct emulsifiers may have an HLB value that is at least 10, such as an ethoxylated alcohol, fatty alcohol, fatty ether sulphate, or phospholipid. Surfactant compositions in accordance with one or more embodiments of the present disclosure may include phospholipids of fatty acids. Phospholipids in accordance with the present disclosure are modified tri-glycerides in which a hydroxyl of the glycerin molecule has polar phosphate containing group in place of the fatty acid. Phospholipids have a hydrophilic head and a hydrophobic tail, which may lead to the formation of a bi-layer in water under certain conditions.

In one or more embodiments, surfactant compositions may include a phospholipid having the general formula (I):

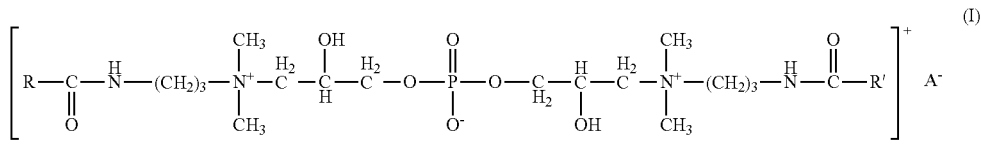

in which R and R' are $C_6$ to $C_{25}$ hydrocarbon groups and A is any suitable anion to counter the cationic charge, such as a conjugate base of a strong inorganic acid or organic acid. In one or more embodiments, anions may be selected from halide, nitrate, sulfate, phosphate, anions of $C_1$ to $C_{10}$ organic acids, as well as combinations of these and other similar anions. In some embodiments, phospholipids may include one or more fatty acid amidopropyl propylene glycol dimonium phosphate salt in which the fatty acid is a $C_{10}$-$C_{25}$ fatty acid.

In some embodiments, surfactant compositions may include phospholipids such as cocamidopropyl PG-dimonium chloride phosphate (1-propanaminium 3,3',3"-[phosphinylidynetris(oxy)]tris[N-(3-aminopropyl)-2-hydroxy-N,N-dimethyl-N,N',N"-tri-$C_{6-18}$ acyl) and its derivatives, and ricinoleamidopropyl PG-dimonium chloride phosphate. In some embodiments, surfactant compositions may include a phosphate blend and/or phospholipid surfactant. In one embodiment, a phosphate blend surfactant/emulsifier may be ECF-817 commercially available from M-I L.L.C., Houston, Tex.

Surfactant compositions in accordance with the present disclosure may include a viscosifying agent in order to alter or maintain the rheological properties of the fluid. The primary purpose for such viscosifying agents is to control the viscosity and potential changes in viscosity of the drilling fluid. Viscosity control is an important factor because often a subterranean formation may have a temperature gradients between the surface and well depths, which can introduce issues as temperature changes affect fluid rheology when circulating back to the surface. In one or more embodiments, surfactant composition may include one or more viscosifying agents such as xanthan gums, starches, modified starches and synthetic viscosifiers such as polyarcylamides, and the like.

In one or more embodiments, direct emulsion wellbore fluids may include a surfactant composition added in an amount with a range having a lower limit selected from any of 1 ppb, 2 ppb, and 3 ppb, to an upper limit selected from any of 7 ppb, 8 ppb, and 9 ppb, where any lower limit may be combined with any upper limit. However, more or less surfactant may be added to direct emulsion wellbore fluids in accordance with the present disclosure based on the needs of the intended application.

Demulsification of Wellbore Fluids

Wellbore fluids in accordance with the present disclosure may be demulsified by two general mechanisms of disrupting a direct emulsion wellbore fluid: (1) pH modification; and (2) the addition of a chemical demulsifying agent. Demulsification methods in accordance with the present disclosure may be used to separate direct emulsion wellbore fluids in 3 days or less in some embodiments, and in 4 days or less in other embodiments.

Recovery of an oleaginous phase from a direct emulsion may by 80% or more using demulsification methods in accordance with the present disclosure in some embodiments, and 70% or more in other embodiments.

Demulsification by pH Modification

In one or more embodiments, methods of recycling direct emulsion wellbore fluids may involve disrupting the emulsion by destabilizing the surfactant (or surfactant composition) stabilizing the interface between the external and internal phases by the addition of one or more pH modifying agents. While not bound to a particular theory, pH changes may be used to change the ionization state of a surfactant or otherwise interfere with stabilizing forces, increasing the affinity of the surfactant for the aqueous or oleaginous phase and leading to coalescence and phase separation. Following phase separation, the oleaginous and/or aqueous fluids forming the direct emulsion may be isolated and reused in subsequent applications, with or without further processing.

Oleaginous fluids recovered from a demulsified direct emulsion may include aqueous impurities at a percent by volume (vol %) that is less than 1.0 vol %, less than 0.5 vol % in some embodiments, less than 0.2 vol % in some embodiments, and less than 0.1 vol % in other embodiments.

pH Modifying Agents

Basic pH modifying agents may include bases and delayed base generating compounds that increase the concentration of hydroxide in the aqueous phase of the direct emulsion. Examples of basic pH modifying agents include oxides, hydroxides, bicarbonates, or halides of alkaline earth metals, alkali metals, and other metals, such as calcium, magnesium, aluminum, and the like. In one or more embodiments, basic pH modifying agents may include, for example, sodium hydroxide, potassium hydroxide, calcium hydroxide, calcium oxide, magnesium oxide, and the like. The increase of the pH may cause destabilization of the oleaginous internal phase within the aqueous external phase, such as by destabilizing the surfactant/viscosifier complex at the emulsion interface. Following destabilization, the oleaginous phase may coalesce and phase separate. Following initial separation of the oleaginous fluid and the aqueous fluid, it is envisioned that one or more optional separation steps may be included to further clean the fluids, depending on the reuse. In particular embodiments, it is envisioned that the separation oleaginous fluid may be reused in an invert emulsion fluid, where the oleaginous fluid forms the external phase and an aqueous fluid forms an internal phase, such as for further drilling or other wellbore operations.

During demulsification by pH modification, the pH may be increased to at least 10 in some embodiments, at least 11 in some embodiments, at least 12 in some embodiments, and at least 13 in some embodiments.

In one or more embodiments, when the separated aqueous fluid is desired for reuse, a second pH modifying agent (specifically an acid source) may be used to neutralize aqueous fluids generated from the separation of emulsified wellbore fluids. Examples of acid sources that may be used include strong mineral acids, such as hydrochloric acid or sulfuric acid, and organic acids, such as citric acid, salicylic acid, lactic acid, malic acid, acetic acid, and formic acid. Suitable organic acids that may be used as the acid sources may include citric acid, salicylic acid, glycolic acid, malic acid, maleic acid, fumaric acid, and homo- or copolymers of lactic acid and glycolic acid as well as compounds containing hydroxy, phenoxy, carboxylic, hydroxycarboxylic or phenoxycarboxylic moieties. For example, the acid source may be used to adjust the pH from an elevated pH used to disrupt a direct emulsion to a final pH that is desirable for formulation in a subsequent wellbore fluid. It is understood that the final pH may depend on the type of brine, wellbore application, etc., but in various embodiments, the acid source may be used to adjust the aqueous fluid to a pH ranging from 6 to 8. However, because the separated aqueous fluid would contain the phospholipid surfactant described herein, its reuse may be in a compatible formulations that are distinct from invert emulsions and similar fluids formed from a separated and recycled oleaginous fluid.

Chemical Demulsification

In one or more embodiments, methods of recycling direct emulsion wellbore fluids may involve disrupting the emulsion by destabilizing the surfactant (or surfactant composition) stabilizing the interface between the external and internal phases through the addition of a chemical demulsifier. While not bound to a particular theory, chemical demulsifiers may interfere with surfactants sued to stabilize a direct emulsion, which leads to coalescence and phase separation. Following phase separation, the oleaginous and/or aqueous fluids forming the direct emulsion may be isolated and reused in subsequent applications, with or without further processing.

In one or more embodiments, chemical demulsifiers may include invert emulsifiers that disrupt a direct emulsion and promote the formation of distinct phases. In some embodiments, the oleaginous phase of the direct emulsion, now containing at least a portion of the invert emulsifier, may be isolated and used to formulate an invert emulsion fluid, with or without further processing.

Chemical Demulsifiers

Chemical demulsifiers in accordance with the present disclosure may include emulsifiers and surfactants that disrupt stabilizing forces in a direct emulsions, promoting phase separation of the aqueous and oleaginous phases. In one or more embodiments, chemical demulsifiers may include invert emulsifiers, which drive phase separation of direct emulsions. As used herein, the term "invert emulsifier" refers to an emulsifier that leads to the formation of an invert emulsion. In some embodiments, an oleaginous phase recovered from a disrupted direct emulsion may contain at least a portion of the added invert emulsifier, and may be recycled for use as the external phase of an invert emulsion wellbore fluid.

In one or more embodiments, chemical demulsifiers may include invert emulsifiers containing amides, polyamides, and/or amidoamines. In some embodiments, invert emulsifiers include amides and polyamides produced from the reaction of one or more of a C10-C24 fatty acids with one or more polyamines such as ethylenediamine, diethylenetriamine, triethylenetetraamine, tetraethylenepentaamine, and the like. In some embodiments, invert emulsifiers may include a dimer poly-carboxylic C12 to C22 fatty acid, trimer poly-carboxylic C12 to C22 fatty acid, tetramer poly-carboxylic C12 to C22 fatty acid, mixtures of these acids, or a polyamide wherein the polyamide is the condensation reaction product of a C12-C22 fatty acid and a polyamine selected from the group consisting of diethylenetriamine, tri ethylenetetramine; and tetraethylenepentamine.

In one or more embodiments, invert emulsifiers may include a blend of C15 to C40 polyolefins, polyamides with a molecular weight greater than 1200, and amines. Invert emulsifiers of the present disclosure may have an amine number in the range of 25-50. The term "amine number" refers to the ratio of the mass of potassium hydroxide which consumes exactly as much acid on neutralization as does the sample being examined, to the mass of that sample. In one or more embodiments, chemical demulsifiers may include a polyalkenyl succinimide compound.

In one or more embodiments, invert emulsifiers may include an alkoxylated ether acids. In one or more embodiments, the alkoxylated ether acid may be an alkoxylated fatty alcohol terminated with a carboxylic acid, represented by the following formula (II):

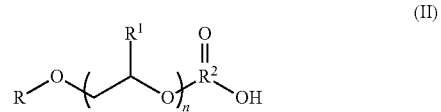

in which R is $C_6$-$C_{24}$ or —C(O)$R^3$ (where $R^3$ is $C_{10}$-$C_{22}$), $R^1$ is H or $C_1$-$C_4$, $R^2$ is $C_1$-$C_5$ and n may range from 0 to 20 in one or more embodiments. Alkoxylated ether acids in accordance with the present disclosure may include compounds formed by the reaction of an alcohol with a polyether (such as poly(ethylene oxide), poly(propylene oxide), poly(butylene oxide), or copolymers of ethylene oxide, propylene oxide, and/or butylene oxide) to form an alkoxylated alcohol. The alkoxylated alcohol may then be reacted with an α-halocarboxylic acid (such as chloroacetic acid, chloropropionic acid, etc.) to form the alkoxylated ether acid.

In one or more embodiments, invert emulsifiers may include tall oil fatty acid (TOFA) amides, such as TOFA diethanolamide, mono-ethanol amide, di-ethanol amide, isopropanol amide, oleic-based amides, such as oleic acid diethanolamide or similar amides with different head groups (e.g., oleyl sarcosinate and oleyl taurate), polyisobutylene-succinic anhydride, and the like. Invert emulsifiers may also include invert emulsifiers such as SURE-MUL™, PRIMO-MUL™, which is commercially available from M-I L.L.C., Houston, Tex.

In one or more embodiments, chemical demulsifiers may be added to destabilize a a direct emulsion, where the chemical demulsifier is added at a percent by volume (vol %) in a range having a lower limit selected from any of 1 vol %, 2 vol %, and 3 vol %, to an upper limit selected from any of 7 vol %, 8 vol %, and 9 vol %, where any lower limit may be combined with any upper limit. However, more or less chemical demulsifier may be added to direct emulsion wellbore fluids in accordance with the present disclosure based on the needs of the intended application. For example, less surfactant composition may be added in applications where more treatment time is available, where lower concentrations of added surfactant can slow the demulsification process.

Methods in accordance with the present disclosure may proceed by recovering a used direct emulsion wellbore fluid. Following recovery, the direct emulsion wellbore fluid is treated to destabilize the surfactant composition, which is then separated into the constituent aqueous and oleaginous phases. As discussed above, destabilization may be achieved through pH modification or the addition of chemical demulsifiers. The separated phases are then processed for disposal or are reformulated for reuse.

Demulsification by pH modification results in the isolation of an aqueous phase containing the initial surfactant composition and having an elevated pH that may be treated with a neutralization agent that reduces pH to a level that is appropriate for the intended application, such as reformulation in a new direct emulsion wellbore fluid. The oleaginous phase may be processed to remove additional impurities or used directly to formulate new wellbore fluids or other applications. The use of chemical demulsifiers to disrupt direct emulsion wellbore fluids results in the isolation of an aqueous phase containing the initial surfactant composition, which may be reused accordingly, and an oleaginous phase containing the chemical demulsifier (invert emulsifier), which may be used to formulate invert emulsion wellbore fluids and similar applications.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (0 for any limitations of any of the claims herein, except for those in which the claim expressly uses the words 'means for' together with an associated function.

What is claimed:

1. A method of recycling a direct emulsion wellbore fluid, the method comprising:
   disrupting a direct emulsion comprising an aqueous external phase and an oleaginous internal phase, wherein the direct emulsion is stabilized by a surfactant composition; and
   separating the aqueous phase and the oleaginous phase;
   wherein disrupting the direct emulsion comprises adding an invert emulsifier;
   further comprising:
   formulating an invert emulsion wellbore fluid from the oleaginous phase comprising the invert emulsifier.

2. The method of claim 1, wherein the surfactant composition comprises a phospholipid surfactant.

3. The method of claim 1, wherein the separated oleaginous phase comprises less than 1 vol % of aqueous impurities.

4. The method of claim 1, wherein disrupting the direct emulsion comprises increasing the pH of the direct emulsion to a pH equal to or greater than 10.

5. The method of claim 4, further comprising neutralizing the aqueous phase prior to reuse.

6. The method of claim 1, wherein the separated oleaginous phase is used to formulate a direct emulsion wellbore fluid.

7. The method of claim 1, wherein the separated oleaginous phase is used to formulate an invert emulsion wellbore fluid.

8. The method of claim 1, wherein the separated oleaginous phase comprises the invert emulsifier.

9. The method of claim 2, wherein the phospholipid surfactant has the general formula:

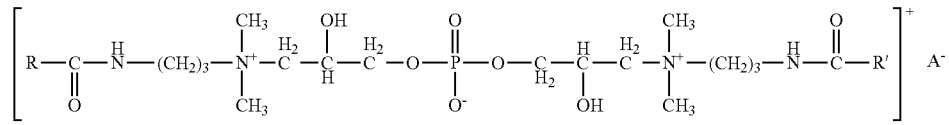

where R and R' are $C_6$ to $C_{25}$ hydrocarbon groups and A is any suitable anion.

10. The method of claim 1, wherein the surfactant composition further comprises a viscosifying agent.

11. The method of claim 1, wherein the amount of oleaginous internal phase is from about 15% to about 50% by volume of the fluid.

12. The method of claim 1, wherein the amount of aqueous external phase is from about 50% to about 85% by volume of the wellbore fluid.

* * * * *